United States Patent [19]

Hasegawa et al.

[11] Patent Number: 4,880,091
[45] Date of Patent: Nov. 14, 1989

[54] CONTROL CIRCUIT FOR FLUID COUPLING WITH LOCK-UP CLUTCH

[75] Inventors: Hiromi Hasegawa, Oobu; Toshiaki Ishiguro, Nagoya, both of Japan

[73] Assignee: Aisin Seiki Kabushiki Kaisha, Kariya, Japan

[21] Appl. No.: 174,811

[22] Filed: Mar. 29, 1988

[30] Foreign Application Priority Data

Mar. 31, 1987 [JP] Japan .................................. 62-76404

[51] Int. Cl.$^4$ .................... F16H 45/02; F16D 47/02
[52] U.S. Cl. ..................................... 192/3.3; 192/3.29
[58] Field of Search .................. 192/3.29, 3.3; 74/733

[56] References Cited

U.S. PATENT DOCUMENTS

| | | | |
|---|---|---|---|
| 2,736,412 | 2/1956 | Livezey ........................... | 192/3.3 X |
| 3,252,352 | 5/1966 | General et al. . | |
| 4,051,932 | 10/1977 | Arai et al. ............................. | 192/3.3 |
| 4,781,279 | 11/1988 | Georg ................................... | 192/3.3 |

FOREIGN PATENT DOCUMENTS

| | | | |
|---|---|---|---|
| 0043545 | 1/1982 | European Pat. Off. ........... | 192/3.29 |
| 55-109853 | 8/1980 | Japan . | |
| 58-121352 | 7/1983 | Japan . | |
| 60-30863 | 2/1985 | Japan . | |
| 60-30864 | 2/1985 | Japan . | |

Primary Examiner—Rodney H. Bonck
Attorney, Agent, or Firm—Burns, Doane, Swecker & Mathis

[57] ABSTRACT

A control circuit of a fluid coupling with a lock-up clutch includes a fluid coupling having a power chamber into which a working fluid is introduced for performing a transfer action between input and output elements via the fluid, a clutch member which suitably connects and disconnects the input and output elements, a working chamber formed separately of the power chamber, and a piston member displaced by a pressure difference between the working and power chambers to selectively engage and disengage the clutch member. The control circuit also includes a fluid pressure source for supplying the working fluid to the power chamber, a lock-up clutch control unit for selectively supplying and discharging a fluid to and from the working chamber to control the engagement and disengagement of the clutch member, a control apparatus responsive to supply and discharge of the fluid to and from the working chamber by the lock-up clutch control unit for lowering pressure inside the power chamber to a hydraulic pressure in proportion to that from a throttle valve, and an oil line for supplying a lubricant pressure line via a port in the lock-up clutch control unit with some of such working fluid to be supplied to the working chamber.

10 Claims, 3 Drawing Sheets

CONTROL CIRCUIT FOR FLUID COUPLING WITH LOCK-UP CLUTCH

BACKGROUND OF THE INVENTION

This invention relates to a hydraulic control circuit for a fluid coupling equipped with a lock-up clutch and finds use in, e.g. a torque converter having a lock-up clutch for an automatic transmission.

An example of a conventional control circuit for a fluid coupling with a lock-up clutch has already been proposed in Japanese Pat. KOKAI Publication No. 60-30864. In order to operate the lock-up clutch in a torque converter efficiently, this conventional control circuit is adapted to lower the pressure inside the torque converter in response to actuation of the lock-up clutch, thereby enlarging the differential pressure between the hydraulic pressure of the lock-up clutch and the hydraulic pressure of the torque converter. The pressure in the torque converter is regulated to a constant pressure with respect to the throttle opening. At the same time, lubrication pressure is also regulated to a constant value. A problem is that since lubrication must be regulated to a pressure capable of assuring a requisite lubricant flow rate at full throttle, the amount of lubricant which flows at low throttle is greater than the optimum amount of lubricant flow and there is an increase in oil pump loss.

Similarly, the pressure in the torque converter at low throttle is higher than the optimum pressure. Therefore, in order for the differential pressure between the hydraulic pressure of the lock-up clutch and the torque converter pressure to be provided with a prescribed magnitude, the lock-up torque hydraulic pressure must be comparatively high. This has an adverse effect upon efficiency of the oil pump.

SUMMARY OF THE DISCLOSURE

Accordingly, a fundamental object of the present invention is to solve the aforementioned problems encountered in the prior art.

In order to improve upon the prior art mentioned above, the applicant has already filed an application disclosing control means so adapted that the internal pressure of a torque converter is lowered to a hydraulic pressure depending upon that from a throttle valve in response to operation of a lock-up clutch. This already proposed arrangement is shown in FIG. 2.

In the arrangement of FIG. 2, the hydraulic pressure ($P_{L/C}$) of the lock-up clutch is made to act as pilot pressure upon an oil chamber 26 of a secondary regulator valve 27. Consequently, the pressure regulating point of the secondary regulator valve 27 descends to the lower side of the Figure and leakage of lubrication pressure from the oil chamber 15 to a drain port 16 increases, as a result of which lubrication pressure and the flow rate toward a cooler E decrease (see curve 8 in FIG. 3). Since there is almost no slip of the torque converter when the lock-up clutch is engaged, no particular difficulties arise even if the amount of flow to the cooler E diminishes. However, when the lubricant pressure drops, such problems as bearing seizure and poor meshing of gears occur.

Accordingly, another object of the present invention is to provide a novel control circuit for a fluid coupling with a lock-up clutch for solving the problem of a drop in lubrication pressure.

According to the present invention, the foregoing object is attained by providing a control circuit for a fluid coupling with a lock-up clutch, comprising:

a fluid coupling having a power chamber into which a working fluid is introduced for performing a transfer action between an input element and an output element via the fluid, a clutch member adapted so as to suitably connect and disconnect the input element and output element, a working chamber formed separately of the power chamber, and a piston member displaced by a pressure difference between the working chamber and the power chamber for selectively engaging and disengaging the clutch member;

a fluid pressure source for supplying the working fluid to the power chamber of the fluid coupling;

lock-up clutch control means for selectively supplying and discharging a fluid to and from the working chamber to control the engagement and disengagement of the clutch member;

control means responsive to a supply of the fluid to the working chamber by the lock-up clutch control means for lowering pressure inside the power chamber, which is supplied by the fluid pressure source, to a hydraulic pressure depending upon hydraulic pressure from a throttle valve; and an oil line for supplying a lubricant pressure line with fluid to be supplied to the working chamber, via a port provided in the lock-up clutch control means when the fluid is supplied to the working chamber Thus, according to the invention, an improvement is made upon a hydraulic control circuit to prevent a drop in lubricating oil pressure while maintaining the outstanding characteristics obtained by lowering the internal pressure of the torque converter (power chamber) to a hydraulic pressure depending upon that from the throttle valve when the lock-up clutch is engaged. As a result, the various components of an automatic transmission can be supplied with the proper amount of lubricant. In addition, additional lubricant pressure is supplied when the lock-up clutch is engaged and cut-off when the lock-up clutch is disengaged, and the supply and cut-off of the additional lubricant pressure are performed independently. This enables control to be carried out with facility.

In a preferred embodiment, the control means is provided between the fluid pressure source and the lubricant pressure line, which is connected to the power chamber, and the oil line is connected to the lubricant pressure line without intervention of the control means. The oil line is provided with an orifice having an opening whose diameter is a predetermined size or value. The port is opened when the clutch member is in an engaged state, and the opening diameter of the orifice is set so as to obtain a lubricant pressure which is substantially the same as that obtained when the clutch member is in a disengaged state.

In the preferred embodiment, the lock-up clutch control means comprises a spool valve having a spool, with opening and closing of the port being controlled by the spool of the spool valve.

In the preferred embodiment, the port is closed when the clutch member is in the disengaged state, and the lubricant pressure is supplied to the lubricant pressure line through the control means.

DETAILED DESCRIPTION OF THE PREFERRED EMBODIMENTS

A preferred embodiment of the present invention will now be described in detail with reference to the drawings.

Figure 1:
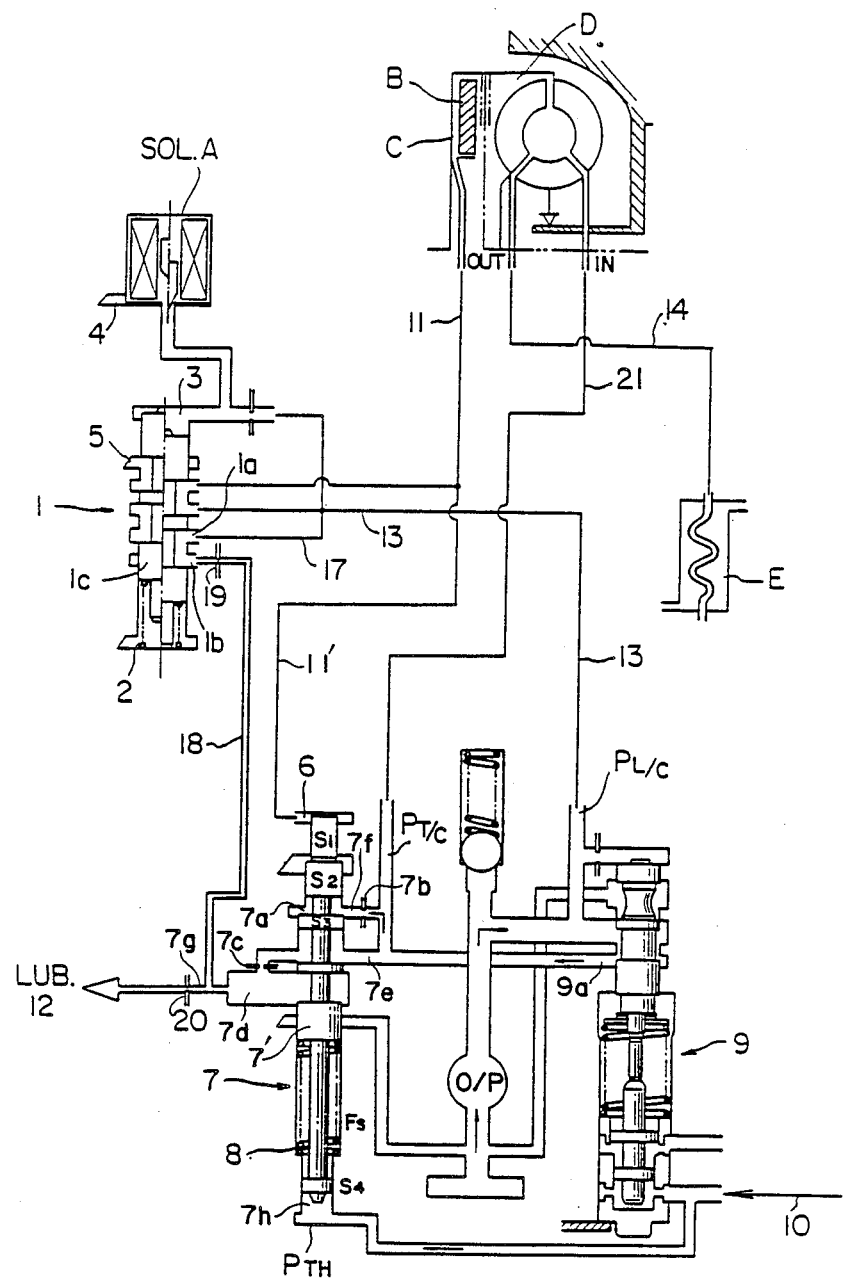
FIG. 1 is a hydraulic control circuit diagram illustrating an embodiment of the present invention.
Figure 2:
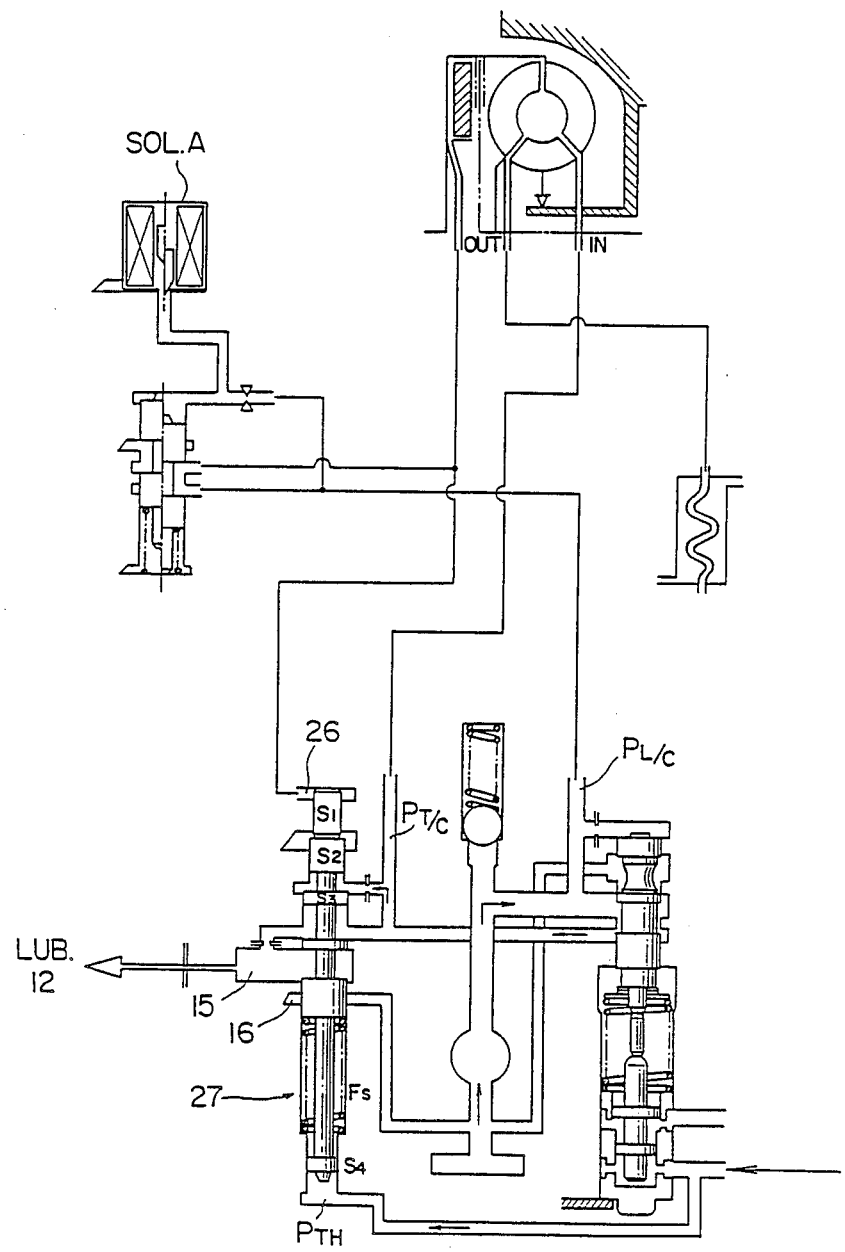
FIG. 2 is a hydraulic control circuit diagram illustrating a hydraulic control circuit for which a Japanese application has already been filed by the applicant.

FIG. 1 illustrates an embodiment of the invention. A lock-up clutch control valve 1 includes a spring 2 and an oil chamber 3. Numerals 4 and 5 denote drain ports, 6 an oil chamber, 7 a secondary regulator valve having a spring 8, 9 a primary regulator valve, and 10, 11, 11', 12, 13, 14 and 21 oil lines.

The lock-up clutch control valve 1 has an inlet port 1a communicating with the oil line 13 via an oil line 17, and an outlet port 1b continuously communicating with the oil lubricant pressure line 12 via an oil line 18, a port 7g and the orifice 20. Thus, the oil lines 12 and 13 are communicable with each other via the oil lines 17 and 18 and the ports 1a and 1b of the lock-up clutch control valve 1.

The oil lines 18 and 12 are provided with orifices 19 and, 20 respectively, the diameters of which are varied, i.e., set, in dependency upon the required amount of lubricant to enable adjustment of lubricating oil pressure.

The primary regulator valve 9 includes a spool with a plurality of lands, a pressure-regulating output port 9a communicating with a power chamber D, an oil chamber provided at one end (the lower end in FIG. 1) and receiving a throttle pressure $P_{Th}$, a second oil chamber provided at the other end (the upper end in FIG. 1) and receiving some return of a regulated pressure of the primary regulator valve, and a spring urging the spool in the same direction as the throttle pressure $P_{Th}$ and seated between the opposite oil chambers.

The secondary regulator valve 7 comprises a spool 7' with a plurality of lands, an oil chamber 7a communicating with the power chamber D, a port 7f communicating with the oil chamber 7a and having a restrictive orifice 7b, a port 7e communicating with the pressure-regulating output port 9a of the primary regulator valve 9, a lubrication output chamber 7d communicating with the oil line 18 via the port 7g and having a restrictive orifice 7c and an orifice 20 of which the diameter is adjustable, an oil chamber 7h provided at one end (the lower end in FIG. 1) and receiving the throttle pressure $P_{Th}$, the second oil chamber 6 provided at the other end (the upper end in FIG. 1) and communicating with a working chamber C, and the spring 8 seated between the oil chamber 7h and the lubrication output chamber 7d and urging the spool 7' towards the second oil chamber 6.

The oil chamber (working chamber) C of a lock-up clutch B is communicated with the oil chamber 6 of the secondary regulator valve 7 via the oil lines 11 and 11', so as to apply the same pressure ($P_{L/C}$) as applied in the working chamber C onto the spool 7' (effective pressure area $S_1$) against a spring force of the spring 8 and the throttle pressure $P_{Th}$. The secondary regulator valve 7 regulates the output pressure $P_{L/C}$ of the primary regulator valve 9 to an output pressure $P_{T/C}$ of the former in dependence upon a balance established by forces acting on the area $S_1$ (in the oil chamber 6) of the spool 7' in a direction against forces acting on the spool 7' by the spring 8, throttle pressure $P_{Th}$ (pressure area $S_4$) and an effective pressure area ($S_3 - S_2$) of the oil chamber 7a communicating with the secondary regulator valve output pressure $P_{T/C}$ via the orifice 7b. The regulated fluid is also supplied to the lubrication line 12 via the orifice 7c an lubrication output chamber 7d, and the orifice 20. The oil line 18 is communicated to the lubrication output chamber 7d disposed between the two orifices 7c and 20.

When a solenoid A is in a deenergized state, hydraulic pressure in the oil chamber 3 is exhausted from the drain port 4 so that the lock-up clutch control valve 1 is urged upwardly (as indicated by the left side of the valve in FIG. 1) by the spring 2 to exhaust the hydraulic pressure (lock-up clutch control pressure) of the oil chamber (working chamber) C from the drain port 5 through the oil line 11. As a result, a lock-up clutch 8 is released. The pressure in a torque converter D (power chamber) is controlled to a hydraulic pressure supplied by the oil line 12, namely a comparatively low hydraulic pressure ($P_{T/C}$) regulated by the secondary regulator valve 7. Since hydraulic pressure is not produced in the oil chamber 6, the prevailing hydraulic pressure $P_{T/C}$ balances the total of a load of the spring 8 and throttle pressure supplied by the oil line 10. The hydraulic pressure $P_{T/C}$ prevailing at this time is expressed by the following equation:

$$P_{T/C} = \frac{P_{TH} \cdot S_4 + F_s}{S_3 - S_2} \tag{1}$$

Furthermore, the outlet port 1b is closed by a land 1c, so that there is no supply of pressurized oil from the oil line 18 to the oil line 12.

When the solenoid A is energized, hydraulic pressure is produced in the oil chamber 3, as a result of which the lock-up clutch control valve 1 is urged downwardly (as shown by the right side of the valve in FIG. 1) against the force of spring 2, so that hydraulic pressure ($P_{L/C}$) regulated by the primary regulator valve 9 is supplied to the oil chamber C via oil lines 13 and 11, thereby engaging the lock-up clutch 8. Since hydraulic pressure is supplied to the oil chamber 6 from the oil line 11, the hydraulic pressure regulated by the secondary regulator valve 7 is expressed as follows:

$$P_{T/C} = \frac{P_{TH} \cdot S_4 + F_s}{S_3 - S_2} - \frac{P_{L/C} S_1}{S_3 - S_2} \tag{2}$$

In accordance with Eqs. (1) and (2), the internal pressure of the torque converter is varied by the throttle hydraulic pressure $P_{Th}$. In accordance with Eq. (2), the internal pressure of the torque converter is reduced in dependence upon the lock-up clutch control pressure when the lock-up clutch 8 is engaged.

Figure 3:
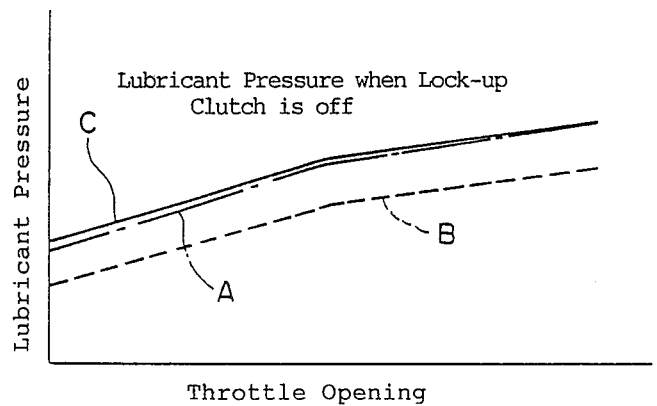
FIG. 3 is a graph showing the relationship between throttle opening and lubricating oil pressure.

When the solenoid A is energized, the outlet port 1b opens to communicate with the port 1a, thereby bringing the oil lines 17 and 18 into communication Accordingly, the oil line 13 is communicated with the oil line 12 through the oil line 17, ports 1a and 1b and the oil line 18. As a result, hydraulic pressure regulated by the primary regulator valve 9 is supplied to the lubrication pressure oil line 12 through the lock-up clutch control valve 1 and orifices 19, 20. Therefore, even though there is a drop in lubrication pressure due to the depressurizing action of the secondary regulator valve 7 on the torque converter D, there is no reduction in lubrication of the components of the automatic transmission, as indicated by curve A in FIG. 3.

As many apparently widely different embodiments of the present invention can be made without departing from the spirit and scope thereof, it is to be understood that the invention is not limited to the specific embodiments thereof except as defined in the appended claims.

What is claimed is:

1. A control circuit for a fluid coupling with a lock-up clutch, comprising;
   a fluid coupling means having a power chamber into which a working fluid is introduced for performing a transfer action between an input element and an output element via the fluid, a clutch member adapted so as to suitably connect and disconnect the input element and output element, a working chamber formed separately of the power chamber, and a piston member displaced by a pressure difference between the working chamber and the power chamber for selectively engaging and disengaging the clutch member;
   a fluid pressure source for supplying the working fluid to the power chamber of said fluid coupling;
   lock-up clutch control means for selectively supplying and discharging a fluid to and from the working chamber to control the engagement and disengagement of the clutch member;
   control means responsive to supply and discharge of the fluid to and from the working chamber by said lock-up clutch control means for lowering pressure inside the power chamber, which is supplied by said fluid pressure source, to a hydraulic pressure depending upon hydraulic pressure from a throttle valve; and
   an oil line for supplying a lubricant pressure line with fluid to be supplied to the working chamber, via a port provided in said lock-up clutch control means.

2. The control circuit according to claim 1, wherein said control means is provided between said fluid pressure source and said lubricant pressure line, which is connected to said power chamber, and said oil line is connected to said lubricant pressure line without intervention of said control means.

3. The control circuit according to claim 2, wherein said oil line is provided with an orifice having an opening whose diameter is predetermined size.

4. The control circuit according to claim 3, wherein said port is opened when said clutch member is in an engaged state, and the opening diameter of said orifice is set so as to obtain a lubricant pressure which is substantially the same as that obtained when said clutch member is in a disengaged state.

5. The control circuit according to claim 2, wherein said lock-up clutch control means comprises a spool valve having a spool, with opening and closing of said port being controlled by the spool of said spool valve.

6. The control circuit according to claim 4, wherein said port is closed when said clutch member is in the disengaged state, and the lubricant pressure is supplied to the lubricant pressure line through said control means.

7. The control circuit according to claim 1, wherein said control means includes a primary regulator valve regulating a fluid from the fluid pressure source in response to the throttle pressure $P_{TH}$ and delivering the resulting regulated fluid to the lock-up clutch control means, and a secondary regulator valve and wherein the secondary regulator valve further regulates a pressure $P_{T/C}$ of the regulated fluid from the primary regulator valve and the power chamber pressure proportionally to the throttle pressure $P_{TH}$ and delivers the further regulated fluid as a lubricant to elements of said fluid coupling means.

8. The control circuit according to claim 7, wherein said secondary regulator valve includes a valve element actuated by the throttle pressure $P_{TH}$ and a pressure opposing the throttle pressure $P_{TH}$ and responsive to a pressure within the working chamber.

9. The control circuit according to claim 8, wherein said secondary regulator valve includes a spool constituting the valve element, an oil chamber communicating with the power chamber, a pressure-regulating output port communicating with the power chamber and a pressure-regulating output port of the primary regulator valve, an oil chamber provided at one end of the secondary regulator valve and receiving the throttle pressure $P_{Th}$, a lubrication output chamber continuously communicating with said oil line and the lubricant pressure line, a second oil chamber provided at the other end of the secondary regulator valve and communicating with the working chamber, and a spring urging the spool towards the second oil chamber, whereby the secondary regulator valve regulates the power chamber pressure $P_{T/C}$ by means of the throttle pressure $P_{TH}$ and the spring.

10. The control circuit according to claim 7, wherein said control means is provided between said fluid pressure source and the lubricant pressure line communicating with the power chamber and wherein said oil line continuously communicates with the lubricant pressure line without the secondary regulator valve.

* * * * *